(12) United States Patent
Okamoto et al.

(10) Patent No.: US 6,576,082 B2
(45) Date of Patent: Jun. 10, 2003

(54) PRIMER COMPOSITION AND BONDING METHOD

(75) Inventors: Toshihiko Okamoto, Hyogo (JP); Junji Takase, Hyogo (JP)

(73) Assignee: Kaneka Corporation, Osaka (JP)

( * ) Notice: Subject to any disclaimer, the term of this patent is extended or adjusted under 35 U.S.C. 154(b) by 55 days.

(21) Appl. No.: 09/800,513

(22) Filed: Mar. 8, 2001

(65) Prior Publication Data

US 2001/0031315 A1 Oct. 18, 2001

(30) Foreign Application Priority Data

Mar. 8, 2000 (JP) .................................... 2000-063047
Sep. 11, 2000 (JP) .................................... 2000-274827

(51) Int. Cl.⁷ ............................................ C09J 119/00
(52) U.S. Cl. .................... 156/329; 525/100; 525/105; 525/106
(58) Field of Search ................ 525/100, 102, 525/105; 156/329

(56) References Cited

U.S. PATENT DOCUMENTS

| 4,904,732 A | 2/1990 | Iwahara et al. |
| 5,223,575 A | 6/1993 | Mori et al. |

FOREIGN PATENT DOCUMENTS

| DE | 39 39 472 A1 | 5/1990 |
| JP | 1-168764 | 7/1989 |
| JP | 2000-186176 | 7/2000 |

*Primary Examiner*—Robert Dawson
*Assistant Examiner*—Christopher M. Keehan
(74) *Attorney, Agent, or Firm*—Armstrong, Westerman & Hattori, LLP

(57) ABSTRACT

The present invention provides a primer composition comprising (A) a vinyl polymer having a main chain substantially comprising vinyl copolymer chain and at least one silicon-containing group having a hydroxy group or a hydrolyzable group bonded to a silicon atom and capable of crosslinking by forming a siloxane bond at the terminal end of the main chain and/or side chain, and (B) (a) a saturated hydrocarbon polymer having at least one silicon-containing group having a hydroxy group or a hydrolyzable group bonded to a silicon atom and capable of crosslinking by forming a siloxane bond, and/or (b) a polybutadiene polymer having at least one silicon containing group having a hydroxy group or a hydrolyzable group bonded to a silicon atom and capable of crosslinking by forming a siloxane bond, which can remarkably improve the adhesion to various kinds of substrates, and which is particularly useful when applied to the isobutylene series sealing material.

16 Claims, No Drawings

PRIMER COMPOSITION AND BONDING METHOD

FIELD OF THE INVENTION

This invention concerns a primer composition and a bonding method. More in particular, it relates to a primer composition which is effective for sealing material comprising, as a main ingredient, a saturated hydrocarbon polymer having a hydroxy group or a hydrolyzable group bonded to a silicon atom and capable of crosslinking by forming a siloxane bond (hereinafter referred to as "reactive silicon group") (particularly, isobutylene sealing material having an isobutylene polymer as a main skeleton), as well as bonding method.

BACKGROUND OF THE INVENTION

Elastic sealing materials have been used generally in recent years, for example, in buildings and automobiles. Sealing materials are used being filled at joining portions or gaps between various kinds of members to provide them with water tightness and air tightness. Accordingly, they have to show good adhesion to various kinds of substrates constituting joints or periphery of window frames, that is, inorganic materials such as glass, ceramic, metal, cement and mortar and organic materials such as plastic (hereinafter they are collectively referred to as "substrates"). However, the sealing materials often have insufficient adhesion and use of primers is essential in most cases.

As sealing materials applied to joints in interiors and exteriors of general buildings, silicone, modified silicone, polysulfide and polyurethane series materials have been well-known. Such sealing materials are used selectively based on the concept of using appropriate sealing materials selectively depending on the kind of joints (also including the kind of substrates) so as to "put right material for right place", and primers of exclusive use adaptable to respective sealing materials have been developed.

On the other hand, isobutylene series sealing materials having isobutylene polymer comprising reactive silicon groups as the main skeleton have been developed recently. The isobutylene series sealing materials have advantageous characteristics in that they are excellent in dynamic conformity, heat resistance, weather proofness, water proofness and coatability, and do not contaminate the periphery of joints and they have a function as a general-purpose sealing material. As a primer effective for the isobutylene series sealing materials, JP-A-Hei.11-343429 (term "JP-A" as used herein means an "unexamined published Japanese patent application") discloses a primer composition comprising a saturated hydrocarbon polymer having reactive silicon groups. However, there is still a problem that adhesion to less bondable substrates such as metals coated with acrylic paints is not sufficient even when the primer is used.

JP-A-Sho.52-43831 discloses a primer composition comprising a vinyl (acrylic) copolymer having reactive silicon groups as a primer effective upon bonding silicone elastomers to porous substrates such as of concrete or mortar and various kinds of metal substrates. However, when non-polar sealing material such as isobutylene sealing materials described previously is used, affinity with a primer mainly comprising a highly polar vinyl (acrylic) copolymer is poor failing to sometimes obtain sufficient adhesion.

SUMMARY OF THE INVENTION

This invention intends to provide a primer composition having satisfactory adhesion to various kinds of substrates and, particularly, this invention intend to provide a primer composition for favorably bonding a sealing material comprising a saturated hydrocarbon polymer having a reactive silicon group as the main ingredient and various kinds of substrates, and an adhesion method.

The present inventors have made an earnest study for overcoming such problems and have accomplished this invention on the finding that the object can be attained by a primer composition comprising a vinyl copolymer having reactive silicon groups and a saturated hydrocarbon polymer having reactive silicon groups or a polybutadiene polymer having reactive silicon groups.

The present invention relates to:

(1) A primer composition comprising (A) a vinyl polymer having a main chain substantially comprising vinyl copolymer chain and at least one silicon-containing group having a hydroxy group or a hydrolyzable group bonded to a silicon atom and capable of crosslinking by forming a siloxane bond at the terminal end of main chain and/or side chain, and (B) at least one ingredient selected from a group consisting of ingredients (a) and (b):

(a) a saturated hydrocarbon polymer having at least one silicon-containing group having a hydroxy group or a hydrolyzable group bonded to a silicon atom and capable of crosslinking by forming a siloxane bond, and (b) a polybutadiene polymer having at least one silicon containing group having a hydroxy group or a hydrolyzable group bonded to a silicon atom and capable of crosslinking by forming a siloxane bond.

(2) A primer composition as defined in (1), which further comprising a silicate compound as a ingredient (C).

(3) A primer composition as defined in (1), which further comprising a silane coupling agent as a ingredient (D).

(4) A primer composition as defined in (1), wherein the vinyl copolymer of the ingredient (A) has a number average molecular weight within a range from 500 to 50,000, and has, per one molecule, one or more hydrolyzable silyl group at the terminal end of the main chain and/or terminal end of the side chain represented by the general formula (1):

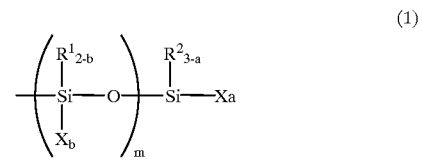

(1)

wherein $R^1$ and $R^2$ represent each, independently, alkyl group of 1 to 20 carbon atoms, aryl group of 6 to 20 carbon atoms, aralkyl group of 7 to 20 carbon atoms, or a triorganosiloxy group represented by $(R')_3SiO$— ($R'$ represent each independently substituted or not substituted hydrocarbon group of 1 to 20 carbon atoms), X represent each independently hydroxy group or hydrolyzable group, a is one or 0, 1, 2 or 3, b is one of 0, 1 or 2 in which a and b are not simultaneously 0 and m is 0 or an integer of 1 to 19).

(5) A primer composition as defined in (1), wherein the vinyl copolymer of the ingredient (A) is a polymer obtained by copolymerization of monomer ingredient comprising styrene monomer as the essential ingredient.

(6) A primer composition as defined in (1), wherein the saturated hydrocarbon polymer as the ingredient (a) has a number average molecular weight within a range from 500 to 50,000 and has, per one molecule, one or more hydrolyzable silyl group represented by the general formula (1) at the terminal end of the main chain and/or terminal end of the side chain.

(7) A primer composition as defined in (1), wherein the saturated hydrocarbon polymer as the ingredient (a) is a polymer having 50% by weight or more in total of repetition units formed from isobutylene.

(8) A primer composition as defined in (1), wherein the polybutadiene as the ingredient (b) has a number average molecular weight within a range from 500 to 50,000 and has the hydrolyzable silyl group represented by the general formula (1) at the terminal end of the main chain and/or terminal end of side chain in an amount from 0.2 to 7.0 mmol/g.

(9) A primer composition as defined in (3), wherein the silane coupling agent of the ingredient (D) is an amino group-containing silane coupling agent and/or mercaptosilane coupling agent.

(10) A method of bonding a sealing material onto a substrate which comprises coating the primer composition as defined in claim 1 onto the substrate and bonding, to the coated surface, a sealing material comprising, as main ingredient, saturated hydrocarbon polymer having at least one silane containing group having a hydroxy group or hydrolyzable group bonded to the silicon atom and capable of crosslinking by forming a siloxane bond.

DETAILED DESCRIPTION OF THE INVENTION

This invention is to be described more in details.

Hereinafter, "% by weight" is based on the whole weight of the primer composition, and "part" is based on 100 parts of the silyl group-comprising vinyl polymer as the ingredient (A), unless otherwise defined.

The vinyl copolymer comprising reactive silicon groups as the ingredient (A) (hereinafter referred to as a silyl group-containing vinyl polymer) is an ingredient characteristics to the invention and has a favorable adhesion to various kind of substrates, for example, porous substrates such as of concrete or mortar and metals and functions as an ingredient for forming tough and curable film excellent in bondable to less adhesive metal substrates coated with acrylic paint or the like.

In the silyl group-containing vinyl polymer, "the main chain substantially comprising vinyl polymer chain" means that segments other than those comprising the vinyl monomer units such as segments comprising urethane bond or siloxane bond are contained to the main chain of the silyl group-containing vinyl polymer within a range not substantially deteriorating the characteristics as the vinyl polymer. Generally, when the segments other than those comprising vinyl monomer units are contained within a range of about 50 atom % or less of atoms constituting the main chain, the characteristics as the vinyl polymer are not substantially deteriorated. As described above, since the main chain substantially consists of a vinyl polymer, a primer of excellent durability and chemical resistance is provided. The amounts of segments other than those comprising vinyl monomer units are preferably 50 atom % or less, more preferably 30 atom % or less, most preferably 10 atom % or less of atoms constituting the main chain.

The reactive silicon group can include the group represented by the general formula:

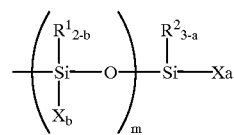

wherein $R^1$ and $R^2$ each represent, independently, alkyl group of 1 to 20 carbon atoms, aryl group of 6 to 20 carbon atoms, aralkyl group of 7 to 20 carbon atoms, or a (R')$_3$SiO— (R' each represent independently substituted or not substituted hydrocarbon group of 1 to 20 carbon atoms), X each represent independently a hydroxy group or a hydrolyzable group, a is one of 0, 1, 2 or 3, b is one of 0, 1 or 2 in which a and b do not simultaneously form 0 and m is 0 or an integer of 1 to 19.

The hydrolyzable group can include, for example, those groups used generally such as hydrogen atom, halogen atom, alkoxy group, acyloxy group, ketoxymate group, amino group, amide group, aminoxy group, mercapto group and alkenyloxy group.

Among them, alkoxy group, amide group and aminoxy group are preferred with the alkoxy group being particularly preferred in that the hydrolyzability is mild and handling is easy.

The hydrolyzable group and the hydroxy group can be bonded within a range from 1 to 3 to one silicon atom, and (a+Σb) is preferably within a range from 1 to 5. When hydrolyzable group and hydroxy group are bonded by two or more to the reactive silicon group, they may be identical or different with each other.

One or more silicon atoms form the reactive silicon group and the number of silicon atoms is preferably 20 or less in a case connected by way of siloxane bond or the like.

Particularly, a reactive silicon group represented by the general formula (2):

wherein $R^2$, X and A have the same meanings as those described above is easily available and preferred.

"Having at least one hydrolyzable silyl groups on the terminal end of the main chain and/or side chain of the silyl group-containing vinyl polymer in one molecule" means that at least one or preferably two or more hydrolyzable silyl groups are present on the terminal end of the main chain and/or the side chain of the polymer. Since at least one hydrolyzable silyl group is present per one molecule, they are increased in the molecular weight or gelled under the presence of water to form a chemically stable siloxane bond to improve the chemical resistance of the coated film. Further, since the hydrolyzable silyl group has a good affinity with the inorganic substrate and causes crosslinking reaction by the presence of water, it can provide an effect that the coated film shows a good adhesion also to inorganic substrates.

In the present invention, the term "and/or" means either or both of.

The mol number of hydrolyzable silyl groups per unit weight in the silyl group-containing vinyl polymer (hereinafter referred to as "Si equivalent") is from 0.2 to 5.0 mmol/g, more preferably, 0.5 to 4.0 mmol/g and, particularly preferably, from 1.0 to 3.0 mmol/g. When the Si equivalent is less than 0.2 mmol/g, the adhesion and the film forming property of the primer composition are not sometimes sufficient.

The number average molecular weight of the silyl group-containing vinyl polymer is preferably about 500 to 50,000, and those of about 1,000 to 30,000 are particularly preferred being easily handlable.

Further, there is also no particular restriction on the glass transition point (Tg) of the polymer and a characteristic feature that the polymer becomes less shrinkable is caused as Tg lowers to 10° C. or lower, while the characteristic feature that the chemical resistance, water proofness and reinforcing property of the substrate are improved more as Tg increases to 30° C. or higher.

There are various methods for producing the silyl group-containing vinyl polymer as described above. They can include, for example, (i) a production process by copolymerization of a vinyl monomer and a hydrolyzable silyl group-containing monomer (hereinafter referred to as silyl group-containing monomer), (ii) a method of copolymerizing a vinyl monomer and a reactive functional group (hereinafter referred to as X group) containing monomer (for example, acrylic acid), and then reacting the resultant copolymer with a compound having a reactive silicon group and a functional group capable of reacting with X group (for instance, compound having an isocyanate group and a —Si(OCH$_3$) group).

The vinyl monomer used upon constituting the vinyl polymer chain as the ingredient (A) can include, for example, various monomers, for example, (meth)acrylate, styrene monomer such as styrene or α-methylstyrene, silicon group-containing vinyl monomer, fluoro-containing vinyl monomer, epoxy group-containing vinyl monomer and maleic acid esters. Among them, (meth)acrylate and styrene monomer are preferred. (Meth)acrylate in this invention means acrylic acid ester or methacrylic acid ester.

There is no particular restriction on the vinyl monomer and concrete examples can include, for example, ester of unsaturated carboxylic acid such as methyl(meth)acrylate, ethyl(meth)acrylate, n-butyl(meth)acrylate, isobutyl(meth)acrylate, t-butyl(meth)acrylate, 2-ethylhexyl(meth)acrylate, lauryl(meth)acrylate, stearyl(meth)acrylate, benzyl(meth)acrylate, cyclohexyl(meth)acrylate, trifluoroethyl(meth)acrylate, pentafluoropropyl(meth)acrylate, diesters or half esters of polycarboxylic acid such as (maleic acid, fumaric acid and itaconic acid) with linear or branched alcohols of from 1 to 20 carbon atoms; styrene monomers such as styrene, o-methylstyrene, m-methylstyrene, p-methylstyrene, α-methylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-dodecylstyrene, p-phenylstyrene, chlorostyrene, styrene sulfonic acid, and 4-hydroxystyrene; vinyl esters and allyl compounds including vinyl acetate, vinyl propionate and diallylphthalate; nitrile group-containing vinyl compounds such as (meth)acrylonitrile; epoxy-group containing vinyl compounds such as glycidyl(meth)acrylate; amino-group containing vinyl compounds such as dimethylaminoethyl(meth) acrylate, diethylaminoethyl(meth)acrylate, vinyl pyridine, and aminoethylvinyl ether; amide-group containing vinyl compounds such as (meth)acrylamide, itaconic diamide, α-ethylacrylamide, methacrylamide, crotonic amide, malic diamide, fumaric diamide, N-vinylpyrrolidone, N-butoxymethyl(meth)acrylamide, N,N-dimethylacrylamide, N-methylacrylamide, and acryloylmorphorin; hydroxy-group containing vinyl compounds such as 2-hydroxyethyl(meth) acrylate, 2-hydroxypropyl (meth)acrylate, 2-hydroxyethylvinyl ether, N-methylol(meth)acrylamide, Aronix 5700 (manufactured by Toa Gosei Kagaku Kogyo Co. Ltd.), Placcel FA-1, Placcel FA-4, Placcel FM-1, Placcel FM-4 (manufactured by Dycel Kagaku Kogyo Co. Ltd.); unsaturated carboxylic acid, acid anhydrides or salts thereof such as (meth)acrylic acid, maleic acid, fumaric acid, itaconic acid, salts thereof (such as alkali metal salts, ammonium salts and amine salts) and maleic anhydride; and other vinyl compounds such as vinyl methyl ether, vinyl chloride, vinylidene chloride, chloroprene, propylene, butadiene, isoprene, maleimide, N-vinyl imidazole and vinyl sulfonic acid. Among them, alkyl(meth)acrylate with 10 or more carbon atoms such as lauryl(meth)acrylate and stearyl(meth)acrylate are preferred since they can form films having good affinity with less polar sealing materials such as isobutylene series sealing materials. Particularly, since the silyl group-containing vinyl polymer obtained from the monomer ingredient containing the styrene monomer can form films of increased thickness and high strength because of high Tg even when the polarity is suppressed relatively low, it is most preferred being effective to a case of bonding the sealing material of low polarity to the porous substrate.

For instance, when the silyl group-containing vinyl polymer having a low Tg of 10° C. or lower is prepared, a vinyl monomer such as butyl acrylate or 2-ethylhexyl(meth)acrylate, the homopolymer of which has a low Tg may be used in a large amount. Further, when the polymer having higher Tg as 30° C. or higher is to be prepared, it may be produced by using a vinyl monomer such as methyl methacrylate, ethyl methacrylate and styrene the homopolymer of which has high Tg may be used in a large amount.

There is no particular restriction also on the silyl group-containing monomer, and concrete examples thereof can include, for example,

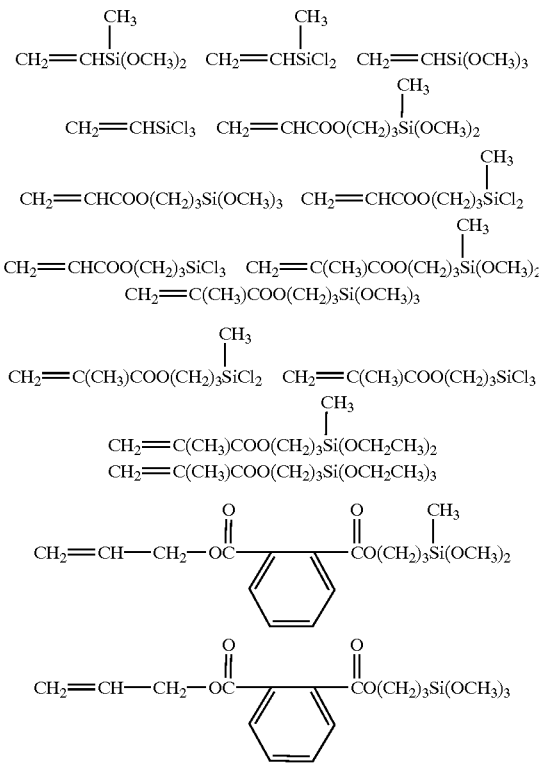

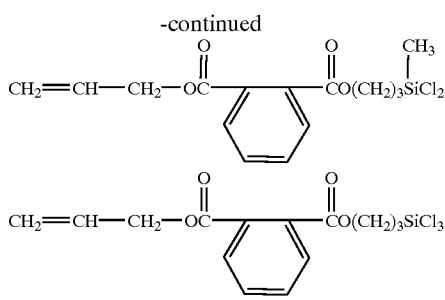

There is no particular restriction on the method of producing the silyl group-containing vinyl polymer from the silyl group-containing monomer and the vinyl monomer and it can be produced in accordance with the method disclosed, for example, in JP-A-Sho.54-36395, JP-A-Sho.57-36109 and JP-A-Hei.157810. Solution polymerization using an azo type radical initiator such as 2,2'-azobisisobutyronitrile or 2,2'-azobis(2-methylbutyronitrile) is most preferred since handling for the initiator is easy, and the mixture of the polymerizing reaction product can be utilized as it is.

In the production, the molecular weight can be controlled by optionally using a chain transfer agent such as n-dodecylmercaptan, t-dodecylmercaptan, n-butylmercaptan, γ-mercaptopropyltrimethoxysilane, γ-mercaptopropyltriethoxysilane, γ-mercaptopropylmethyldimetoxysilane, γ-mercaptopropylmethyldiethoxysilane, $(CH_3O)_3Si$—S—S—Si $(OCH_3)_3$, and $(CH_3O)_3Si$—$S_8$—S—Si $(OCH_3)_3$.

Particularly, when a chain transfer agent having a hydrolyzable silyl group in the molecule, for example, γ-mercaptopropyltrimethoxysilane is used, a hydrolyzable silyl group can be introduced to the terminal end of the silyl group-containing vinyl polymer.

Any solvent can be used for polymerization with no particular restriction so long as it is non-reactive solvent such as hydrocarbons (for example, toluene, xylene, n-hexane, cyclo-hexane), acetates (for example, ethyl acetate and butyl acetate) alcohols (for example, methanol, ethanol, isopropanol, n-butanol), esters (for example, ethyl cellosolve, butyl cellosolve and cellosolve acetate), and ketons (for example, methyl ethyl ketone, ethyl acetoacetate, acetyl acetone, diacetone alcohol, methyl isobutyl ketone and acetone).

The content of the silyl group-containing vinyl polymer in the primer composition of this invention is preferably 1 to 30% by weight, more preferably, 3 to 20% by weight and, particularly preferably, 5 to 10% by weight. Particularly, when the primer composition of this invention is used to a porous substrate such as of mortar, thickness of the film has to be increased for preventing water from leaching out of the porous substrate and the content of the polymer is preferably 2 to 50% by weight, more preferably, 5 to 30% by weight and, particularly preferably, 10 to 20% by weight.

Further, when the silyl group-containing vinyl polymer is adjusted so as to comprise a silyl group-containing vinyl polymer with Tg of 10° C. or lower and a silyl group-containing vinyl polymer with Tg of 30° C. or higher, it is desirably applicable to the porous inorganic substrate such as ALC since the silyl group-containing vinyl polymer with Tg of 10° C. or lower is effective for improving the characteristics such as reduced shrinkability and the silyl group-containing vinyl polymer with Tg of 30° C. or higher is effective for improving the reinforcing property and water proofness.

The ratio of using the silyl group-containing vinyl polymer with Tg of 10° C. or lower and the silyl group-containing vinyl polymer with Tg of 30° C. or higher is preferably about 1/9 to 8/2 by weight.

Tg can be calculated in accordance with the following Fox's formula:

$$\text{Fox's formula } \frac{1}{Tg} = \sum \frac{m_i}{Tg_i}$$

wherein $Tg_i$ represents Tg for the ingredient i, $m_i$ represents weight percentage for the ingredient i.

In this invention, (a) a saturated hydrocarbon polymer having at least one silicon-containing group having a hydroxy group or a hydrolyzable group bonded to a silicon atom and capable of crosslinking by forming a siloxane bond and/or (b) a polybutadiene polymer having at least one silicon-containing group having a hydroxy group or a hydrolyzable group bonded to a silicon atom and capable of crosslinking by forming a siloxane bond can be used as ingredient (B). The ingredient (B) described above functions as a film-forming ingredient having favorable close adhesion to various kinds of substrates such as glass or metal, excellent in weather proof adhesion through glass, and having good compatibility also with sealing material of low polarity such as isobutylene series sealing material.

The saturated hydrocarbon polymer having the reactive silicon group as the ingredient (a) is a polymer not substantially containing carbon—carbon unsaturated bond other than aromatic ring and it can include, for example, polyethylene, polypropylene, polyisobutylene, hydrogenated polybutadiene and hydrogenated polyisoprene.

The reactive silicon group can include those groups represented by the general formula (1) or the general formula (2) as in the case of the silyl group-containing vinyl polymer of the ingredient (A).

The saturated hydrocarbon polymer comprises one or more reactive silicon groups and, desirably, 1.1 to 5 of the groups in one molecule. If the number of reactive silicon groups contained in the molecule is less than 1, the curability is insufficient sometimes failing to obtain favorable films.

The reactive silicon group may be present at the terminal end and/or in the inside of the saturated hydrocarbon polymer molecular chain. Particularly, it is preferred that the reactive silicon group is present at the terminal end of the molecule, since this increases the amount of the effective network chain of the saturated hydrocarbon polymer ingredient contained in the finally formed cured film, and, accordingly, films at high strength can be obtained easily.

The saturated hydrocarbon polymers having the reactive silicon group can be used alone or in combination of two or more of them.

The polymer forming the skeleton of the saturated hydrocarbon polymer having the reactive silicon group used in this invention can be obtained by (1) polymerizing an olefinic compound of 1 to 6 carbon atoms such as ethylene, propylene, 1-butene or isobutylene as the main monomer, or (2) homopolymerizing a diene compound such as butadiene or isoprene, or copolymerizing the diene compound with the olefin compound followed by hydrogenation. The isobutylene polymer or hydrogenated polybutadiene polymer is preferred since functional groups can be introduced easily to the terminal end, the molecular weight can be controlled easily and the number of the end functional groups can be increased.

In the isobutylene polymer, all the polymer units may be formed of isobutylene units or the monomer unit copolymerizable with isobutylene may be contained within a range of 50% or less (% by weight here and hereinafter), more preferably, 30% or less and, particularly preferably, 10% or less in the isobutylene polymer.

The monomer ingredient described above can include, for example, olefins of 4 to 12 carbon atoms, vinyl ethers, aromatic vinyl compounds, vinyl silanes and allyl silanes. The ingredient for the copolymer can include, for example, 1-butene, 2-butene, 2-methyl-1-butene, 3-methyl-1-butene, pentene, 4-methyl-1-pentene, hexene, vinylcyclohexene, methylvinyl ether, ethylvinyl ether, isobutylvinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallydichlorosilane, diallyldimethoxysilane, diallyldimethylsilane, γ-methacryloyloxypropyltrimethoxysilane, and γ-methacryloyloxypropylmethyldimethoxysilane.

Further, when vinyl silanes or allyl silanes are used as the monomer copolymerizable with isobutylene, the silicon content increases to increase groups capable of acting as a silane coupling agent and improve the adhesion of the primer composition obtained.

Also in the hydrogenated polybutadiene polymer or other saturated hydrocarbon polymer, other monomers unit than the monomer unit as the main ingredient may be incorporated as in the case of the isobutylene polymer.

Further, the saturated hydrocarbon polymer having the reactive silicon group used in this invention may be incorporated with a monomer unit leaving double bonds after polymerization such as a polyene compound, for example, butadiene or isoprene, in a range capable of attaining the purpose of this invention, in a small amount, preferably, within a range of 10% by weight or less, further preferably, 5% by weight or less and, particularly preferably 1% by weight or less.

The saturated hydrocarbon polymer is preferably a isobutylene polymer or hydrogenated polybutadiene polymer with a number average molecular weight of about 500 to 50,000 and, particularly preferably, those liquid or flowable polymers having a molecular weight of about 1000 to 20,000 with are preferred a view point of easy handlability.

A process for preparing the saturated hydrocarbon polymer having the reactive silicon group is to be explained.

Among the isobutylene polymers having the reactive silicon group, an isobutylene polymer having a reactive silicon group at the terminal end of the molecular chain can be produced by using a terminal functional type, preferably, all terminal functional type isobutylene polymer obtained by a polymerization method referred to as an inifer method (a cationic polymerization process using a particular compound referred to as inifer which serves both as an initiator and a chain transfer agent). For example, there can be mentioned a method of obtaining a polyisobutylene having an unsaturated group at the terminal end by the dehydrogen halide reaction of the polymer or by the reaction of introduction an unsaturated group into the polymer as described in JP-A-Sho.63-105005 and then conducting addition reaction referred to as hydrosilylating reaction of a hydrosilane compound represented by the general formula (3):

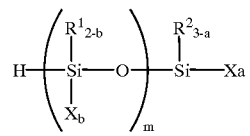

wherein $R^2$, $R^2$, X, a and b have the same meanings as described above (the compound corresponds to the compound in which hydrogen atom is bonded to the group represented by the general formula (1)) and, preferably, a hydrosilane compound represented by the general formula (4):

wherein $R^2$, X and a have the same meanings as described above, by using a platinum catalyst. The hydrosilane compound can include, for example, halogenated silanes such as trichlorosilane, methyldichlorosilane, dimethylchlorosilane, phenyldicylorosilane; alkoxysilanes such as trimethoxysilane, triethoxysilane, methyldiethoxysilane, methyldimethoxysilane, and phenyldimethoxysilane; acyloxysilanes such as methyldiacetoxysilane and phenyldiacetoxysilane; ketoxymatesilanes such as bis(dimethylketoxymate)methylsilane, and bis(cyclohexylketoxymate)methylsilane, with no particular restriction thereto. Among them, halogenated silanes and alkoxy silanes are particularly preferred.

Such production processes are described, for example, in each of the specifications of JP-B-Hei.4-69659, JP-B-Hei.7-108928, Japanese Patent No.2512468, JP-A-Sho.64-22904 and Japanese Patent No. 2539445.

Further, the isobutylene polymer having the reactive silicon group in the molecular chain is produced by adding vinyl silanes or ally silanes having the reactive silicon group in the monomer mainly composed of isobutylene and copolymerizing them.

Further, the isobutylene polymer having the reactive silicon groups at the terminal end and in the inside of the molecular chain is produced, upon polymerization for producing the isobutylene polymer having the reacting silicon group at the terminal end of the molecular chain, by copolymerizing vinyl silanes or allyl silanes having the reactive silicon group in addition to the isobutylene monomer as the main ingredient and then introducing the reactive silicon group to the terminal end.

The vinyl silanes or allyl silanes having the silicon group can include, for example, vinyl trichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethymethoxysilane, diallyldichlorosilane, diallyldimethoxysilane, γ-methacryloyloxypropyltrimethoxysilane, and γ-methacryloyloxypropylmethyldimetoxysilane.

The hydrogenated polybutadiene polymer having terminal olefin groups (hereinafter also referred to as terminal olefin hydrogenated polybutadiene polymer) is produced by converting a hydroxy group of the terminal hydroxy hydrogenated polybutadiene polymer into an oxy metal group such as —ONa or —OK and then reacting an organic halogen compound represented by the general formula (5):

$$CH_2=CH-R^3-Y \qquad (5)$$

wherein Y is a halogen atom such as a chlorine atom and an iodine atom, and $R^3$ is a bivalent organic group represented by —$R^4$—, —$R^4$—OCO— or —$R^4$—CO— (in which $R^4$ is a bivalent hydrocarbon group of 1 to 20 carbon atoms, alkylene group, cycloalkylene group, arylene group or aralkylene group being preferred), with a bivalent group selected from —$CH_2$—, —R"—$C_6H_5$—$CH_2$— (in which R" is a hydrocarbon group of 1 to 10 carbon atoms) being particularly preferred.

The method of converting the terminal oxy group in the terminal hydroxy hydrogenated polybutadiene polymer into the oxy metal group can include a method of reacting with an alkali metal such as Na or K; a metal hydride such as NaH; metal alkoxide such as $NaOCH_3$ or an alkali hydroxide such as NaOH or KOH.

In the method described above, a terminal olefin hydrogenated polybutadiene polymer having substantially the same molecular weight as that of the terminal hydroxy hydrogenated polybutadiene polymer used as the starting material is obtained. In a case where a polymer of higher molecular weight is to be obtained, the molecular weight can be increased by reaction with a polyvalent organic halogen compound containing two or more halogen atoms in one molecule such as methylene chloride, bis(chloromethyl) benzene or bis(chloromethyl) ether before reacting the organic halogen compound of the general formula (5) and then a hydrogenated polybutadiene polymer of higher molecular weight and having an olefin group at the terminal end can be obtained by subsequent reaction with the organic halogen compound represented by the general formula (5).

Specific examples of the organic halogen compound represented by the general formula (5) can include, for example, allylchloride, allylbromide, vinyl(chloromethyl) benzene, allyl(chloromethyl)benzene, allyl(bromomethyl) benzene, allyl(chloromethyl)ether, allyl(chloromethoxy) benzene, 1-butenyl(chloromethyl)ether 1-hexenyl (chloromethoxy)benzene, and allyloxy (chloromethylbenzene) with no particular restriction thereto. Among them, allylchloride is particularly preferred since it is inexpensive and can react easily.

The reactive silicon group can be introduced to the terminal olefin hydrogenated polybutadiene polymer by addition reaction with a hydrosilane compound by using a platinum catalyst as in the case of the isobutylene polymer having the reactive silicon group at the terminal end of the molecular chain.

As described above, when the saturated hydrocarbon polymer having the reactive silicon group does not substantially contain unsaturated bonds other than aromatic rings in the molecule, it has improved weather proofness compared with the film formed by the existent rubber polymer such as organic polymer or oxyalkylene polymer having unsaturated bonds. Further, since the polymer is the hydrocarbon polymer, it has favorable moisture barrier property or water proofness, has excellent bondability to various kinds of inorganic substrate such as of glass and alumina and can form a film of high moisture barrier property.

The content of the saturated hydrocarbon polymer having the reactive silicon group in the primer composition according to this invention is, preferably, 1 to 30% by weight, more preferably, 3 to 20% by weight and, particularly preferably, 5 to 10% by weight. Particularly, when the primer composition according to this invention is used to a porous substrate such as mortar, the thickness of the film has to be increased for preventing water from leaching out of the porous substrate and the content of the polymer is, preferably, 2 to 50% by weight, more preferably, 5 to 30% by weight and, particularly preferably, 10 to 20% by weight.

The saturated hydrocarbon polymer having the reactive silicon group described above itself has high viscosity and the workability is sometimes poor depending on the application use. Therefore, various kinds of plasticizers may be added with an aim of reducing the viscosity of the polymer to improve the handlability, to such an extent as not worsening the adhesion or contamination-reducing property of the primer composition according to this invention.

The plastaicizer having good compatibility with the saturated hydrocarbon polymer as the ingredient (a) of this invention can include, for example, polyvinyl oligomers such as polybutene, hydrogenated polybutene, hydrogenated α-olefin oligomer and atactic polypropylene; aromatic oligomers such as biphenyl and triphenyl; hydrogenated polyene oligomers such as hydrogenated liquid polybutadiene; paraffinic oligomers such as paraffin oil; and chlorinated paraffin oil and cycloparaffinic oligomers such as naphthene oil.

Further, phthalate plasticizer or non-aromatic dibasic acid ester plasticizer and phosphate plastsicizer can also be used in combination with the above-mentioned plasticizer to such an extent as not deteriorating the adhesion, weather proofness and heat resistance of the primer composition according to this invention. They can be used alone or in combination of two or more of them.

The plasticizer may also be used instead of the solvent with an aim of controlling the reaction temperature and controlling the viscosity of the reaction system upon introducing the reactive silicone group to the saturated hydrocarbon polymer.

The blending amount of the plasticizer is, preferably, 2 to 100 parts and, further preferably, 10 to 50 parts based on 100 parts (parts by weight herein and hereinafter) of the reactive silicon group-containing saturated hydrocarbon polymer. If the blending amount of the plasticizer is less than the range described above, the plasticizing effect is insufficient. On the contrary, if it exceeds the range, sufficient adhesion can not be obtained sometimes.

The polybutadiene polymer having the reactive silicon group as the ingredient (b) can be obtained by conducting addition reaction referred to as hydrosililating reaction of the hydrosilane compound represented by the general formula (3) by using a platinum catalyst to the polybutadiene polymer produced by radical polymerization of butadiene, anion polymerization, for example, by using a metallic sodium complex catalyst, or by using a so-called Ziegler catalyst, as in the case of the saturated hydrocarbon polymer having the reactive silicon group as the ingredient (a) described previously.

The mol number of the hydrolyzable silyl group per unit weight in the polybutadiene polymer (hereinafter referred to as "Si equivalent") is, preferably, 0.2 to 7.0 mmol/g, more preferably, 0.5 to 5.0 mmol/g and, particularly preferably, 1.0 to 4.0 mmol/g. If the Si equivalent is less than 0.2 mmol/g, the adhesion and the film forming property of the primer composition is not sometimes insufficient.

The number average molecular weight of the polybutadiene polymer is preferably about 500 to 50,000 and, particularly, liquid or flowable polymers having the molecular weight of about 1,000 to 20,000 are preferred in view of easy handlability.

The polybutadiene polymer has a molecular structure in which 1,2-bonds and 1,4-bonds are bonded at random, and use of a polybutadiene polymer at a higher 1,2-bond ratio is preferred since the hydrosilylating reactivity is higher to the vinyl groups on the side chains formed by 1,2-bonds. The ratio of the 1,2-bonds in the polybutadiene polymer is, preferably, 10 to 99%, more preferably, 30 to 97% and, particularly, preferably, 50 to 95%. Specifically, Nisseki Polybutadiene B-3000 manufactured by Nippon Petrochemical Co. or NISSO-PB B-2000 manufactured by Nippon Soda Co. can be used. Further, as the polybutadiene polymer, those introduced with hydroxy group or carboxyl group may be used and acryl-modified, epoxy-modified or maleic-modified or partial hydrogenated polymers may also be used.

The content of the polybutadiene polymer having the reactive silicon group in the primer composition of this invention is, preferably, 1 to 30% by weight, more preferably, 3 to 20% by weight and, particularly preferably, 5 to 10% by weight. Particularly, when the primer composition of this invention is used for the porous substrates such as mortar, film thickness has to be increased in order to prevent water from leaching out of the porous substrate and the content of the polymer is, preferably, 2 to 30% by weight, more preferably, 5 to 30% by weight and, particularly preferably, 10 to 20% by weight.

According to the present invention, it is preferred that the primer composition further comprises a silicate compound as an ingredient (C). The silicate compound as the ingredient (C) is an organosilicate represented by the general formula (6):

$$(R^5O)_{4-a}SiR^6{}_a \qquad (6)$$

(wherein $R^5$ each represent independently a hydrogen atom or a monovalent hydrocarbon group selected from an alkyl group of 1 to 10, preferably, 1 to 4 carbon atoms, an aryl group, preferably, an aryl group of 6 to 9 carbon atoms such as phenyl group, an aralkyl group, preferably, an aralkyl group of 7 to 9 carbon atoms, preferably, benzyl group. Further, $R^6$ each represent independently a monovalent hydrocarbon group selected from an alkyl group of 1 to 10, preferably, 1 to 4 carbon atoms, an aryl group, preferably, an aryl group of 6 to 9 carbon atoms such as phenyl group, and an aralkyl group, preferably, an aralkyl group of 7 to 9 carbon atoms, preferably, benzyl group and a is 0 or 1) or partial hydrolysis condensates thereof.

Specific examples of the organosilicate compound described above can include, for example, tetraalkylsilicate (tetraalkoxysilane) such as tetramethylsilicate, tetraethylsilicate, tetra n-propylsilicate, tetra i-propylsilicate, tetra n-butylsilicante; tetra i-butylsilicate and tetra t-butyl silicate; alkyltrialkoxysilane such as methyltrimethoxysilane, methyltriethoxysilane, methyltri sec-octyloxysilane, methyltriisopropoxysilane and methyltributoxysilane, and aryltrialkoxysilane such as phenyltrimethoxysilane and phenyltriethoxysilane, alkyltriaryloxysilane such as methyltriphenoxysilane.

The partial hydrolysis condensates of the organosilicate compound can include, for example, those formed by adding water to an organosilicate compound such as tetraalkyl silicate or trialkoxysilane or triaryloxysilane to partially hydrolyze and condensate the same to a usual method. Further, commercially available partially hydrolysis condensates of the organosilicate compounds can be used. Such condensates can include, for example, MSI51, ESI28 and ESI40 (manufactured by Colcoat Co.).

The content of the silicate compound in the primer composition of this invention is, preferably, 0.5 to 30% by weight, more preferably, 1 to 10% by weight and, particularly preferably, 2 to 5% by weight. The silicate compound may be used alone or in admixture or two or more of them.

According to the present invention, it is preferred that the primer composition further comprises a silane coupling agent as an ingredient (D). The silane coupling agent as the ingredient (D) of this invention forms a strong and tough film by reaction with the silyl group containing vinyl polymer as the ingredient (A), the saturated hydrocarbon polymer having the reactive silicon group as the ingredient (a) and the polybutadiene polymer having the reactive silicon group as the ingredient (b) and improves the adhesion strength between the various kinds of substrates such as glass, metal and mortar and various kinds of sealing materials such as isobutylene series sealing materials or modified silicone sealing materials. The silane coupling agent is a compound having a silicon atom-containing group to which the hydrolyzable group is bonded (hereinafter referred to as a hydrolyzable silicon group) and other functional group. Examples of the hydrolyzable silicon group can include those represented by the general formula (1) in which X is a hydrolyzable group. Specifically, those groups always exemplified as the hydrolyzable group can be mentioned and methoxy group and ethoxy group are preferred in view of the hydrolyzing rate. The number of the hydrolyzable groups is preferably two or more and, particularly preferably, 3 or more.

Functional groups other than the hydrolyzable silicone group can include, for example, primary, secondary and tertiary amino groups, mercapto group, epoxy group, carboxyl group, vinyl group, isocyanate group, isocyanurate and halogen. Among them, primary, secondary and tertiary amino groups, mercapto group epoxy group, isocyanate group and isocyanurate are preferred, amino group and mercapto group being particularly preferred.

Specific examples of the silane coupling agent can include amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl) aminopropyltriethoxysilane, γ-(2-aminoethyl) aminopropylmethyldimethoxysilane, γ-(2-aminoethyl) aminopropyltriethoxyysilane, γ-(2-aminoethyl) aminopropylmethyldiethyoxysilane, γ-(2-aminoethyl) aminopropyltriisopropoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto-group containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycydoxypropyltrimethoxysilane, γ-glycidoxypropyltriethoxysilane, γ-glycidoxypropylmethyldimethoxy silane, β-(3,4-epoxycyclohexyl)ethyltriethoxysilane and β-(3,4-epoxycyclohexyl)ethyltriethoxy silane; carboxysilanes such as β-carboxyethyltrimethoxysilane, β-carboxyethylphenylbis(2-methoxyethoxy)silane, N-β-(carboxymethyl) aminoethyl-γ-aminopropyltrimethoxysilane; vinylic unsaturated group-containing silanes such as vinyl trimethoxysilane, vinyl triethoxysilane, γ-methacryloyloxypropylmethyldimethoxysilane, and γ-acrloyloxypropylmeththyltriethoxysilane; halogen-containing silanes such as γ-chloropropyltrimethoxysilane; isocyanurate silanes such as tris(trimethoxysilyl) isocyanurate; and isocyanate group-containing silanes such as γ-isocyanate propyltrimethoxysilane, γ-isocyanate propyltriethoxysilane, γ-isocyanate propylmethyldiethoxysilane, and γ-isocyanate propylmethyldimethoxy silane. In addition, their modified derivatives including amino modified silyl polymer, silylated amino polymer, unsaturated amino silane complex, block isocyanate silane, phenylamino long chained alkyl silane, amino silylated silicone and silylated polyester can also be used as the silane coupling agent.

The coupling agent for use in this invention is used within a range from 0.1 to 10,000 parts based on 100 parts of the silyl group-containing vinyl polymer as the ingredient (A). It is particularly preferably used in a rage from 1 to 100 parts. The silane coupling agent may be used alone or a mixture of two or more of them.

For the primer composition of this invention, a adhesion improver other than the silane coupling agent can also be used.

In this invention, a silanol condensation catalyst can be used as an ingredient having a function of curing the primer composition and providing an air drying property.

The silanol condensation catalyst can include, for example, bivalent and tetravalent tin curing catalyst, aluminum catalyst, amine catalyst and organic titanate esters. Among them, bivalent tin curing catalyst and organic titanate esters are more preferred.

Specific examples of the bivalent tin curing catalyst can include, for example, tin octylate or tin stearate. Specific examples of the tetravalent tin curing catalyst can include tin carobxylates, dialkyl tin oxides and compounds represented by the general formula (7):

$$Q_dSn(OZ)_{4-d} \text{ or } [Q_2Sn(OZ)]_2O \quad (7)$$

wherein Q represents a monovalent hydrocarbon group of 1 to 20 carbon atoms, Z represents a monovalent hydrocarbon group of 1 to 20 carbon atoms or an organic group having a functional group capable of forming coordination bond to Sn at the inside thereof, and d is 0, 1, 2 or 3. Further, a reaction product of a tetravalent tin compound such as a dialkyl tin oxide or a dialkyl tin diacetate and a low molecular weight silicon compound having a hydrolyzable silicon group such as tetraethoxy silane, methyl trietoxy silane or diphenyl dimethoxy silane or phenyl trimethoxy silane is also effective as a curing catalyst for remarkably promoting the silanol condensating reaction. Among them, the compound represented by the general formula (7), that is, a chelate compound such as dibutyl tin bisacetyl acetonate and tin alcoholate are more preferred since they have high activity as the silanol condensation catalyst and increase film forming rate for the primer composition.

Specific examples of the tin carboxylates can include, dibutyl tin dilaurate, dibutyl tin diacetate, dibutyl tin diethylhexanolate, dibutyl tin dioctate, dibutyl tin dimethyl maleate, dibutyl tin diethyl maleate, dibutyl tin dibutyl maleate, dibutyl tin diisoocbyl maleate, dibutyl tin tridecyl maleate, dibutyl tin dibenzyl maleate, dibutyl tin maleate, dioctyl tin diacetate, dioctyl tin distearate, dioctyl tin dilaurate, dioctyl tin diethyl maleate, and dioctyl tin diisooctyl maleate.

Specific examples of the dialkyl tin oxides can include dibutyl tin oxide, dioctyl tin oxide or a mixture of dibutyl tin oxide and phthalate ester.

Specific examples of the chelate compound can include, for example,

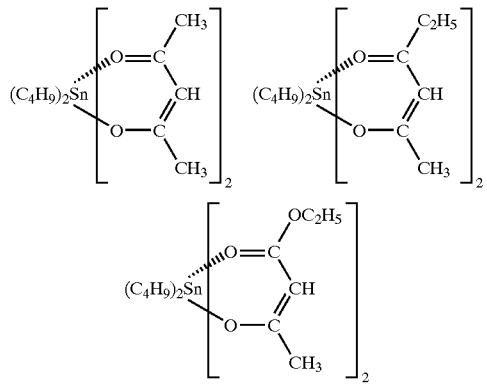

with no particular restriction thereto. Among them, dibutyl tin bisacetyl acetonate is most preferred since the activity is high, and it is available easily at a reduced cost.

The tin alcoholates be can specifically exemplified as:

(C₄H₉)₃SnOCH₃

(C₄H₉)₂Sn(OCH₃)₂

C₄H₉Sn(OCH₃)₃

Sn(OCH₃)₄

(C₄H₉)₂Sn(OC₃H₇)₂

(C₄H₉)₂Sn(OC₄H₉)₂

(C₄H₉)₂Sn(OC₈H₁₇)₂

(C₄H₉)₂Sn(OC₁₂H₂₅)₂

(C₈H₁₇)₂Sn(OCH₃)₂

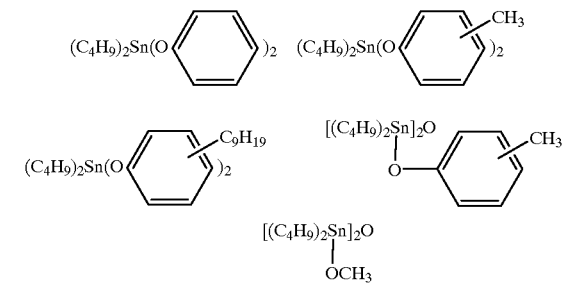

with no restriction thereto. Among them, dialkyl tin dialkoxide is preferred. Particularly, dibutyl tin dimethoxide is more preferred since it is easily available at a reduced cost.

Other specific examples of the catalyst than the tin curing catalyst described above can include, for example, aluminum curing catalyst such as aluminum trisacetylacetonate, aluminum trisethylacetoacetate and diisoopropoxyaluminum ethyl acetoacetate; zirconium tetraacetyl acetonate; lead octylate; amine-hardening catalyst such as butylamine, octylamine, laurylamine, dibutylamine, monoethanolamine, diethanolamine, triethanolamine, diethylenetriamine, triethylene tetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8- diazabicyclo(5,4,0)undecene-7(DBU), or salts of such amine series compounds with carboxylic acids.

The organic titanate esters described above can include, for example, organic titanate esters, chelate compounds of titanium, chelate compound of titanium with silicate ester, titanate coupling agent and partial hydrolysis condensates thereof. Specific examples of the organic titanate esters can include, for example, tetraisopropyltitanate, tetranormalbutyltitanate, butyltitanate dimer, tetrakis(2-ethylhexyl)titanate, tetrastearyltitanate, tetramethyltitanate, titanium diethoxybis(acetylacetonate), titanium diisopropylbis(acetylacetonate), diisopropoxybis(ethylacetoacetate), titanium isopropoxy(2-ethyl-1,3-hexanediolate), titanium di(2-ethylhexoxy)bis(2-ethyl-1,3-hexanediolate), titanium di-n-buthoxybis(triethanolaminate), titanium tetraacetylacetonate, titanium hydroxybis(lactate) and hydrolysis condensates thereof.

The catalysts may be used alone or in combination of two or more of them.

The blending amount of the silanol condensation catalyst is, preferably about, 0.01 100 parts and, further preferably, 0.1 to 20 parts based on 100 parts of the silyl group-containing vinyl polymer as the ingredient (A). If the blending amount of the silanol condensation catalyst is less than the range described above, the film forming rate is sometimes lowered and the film can not be formed sometimes sufficiently. On the other hand, when the blending amount of the silanol condensation catalyst is more than the range, the open time is shortened excessively to sometimes worsen the operability and it is not preferred also in view of the store stability.

In this invention, a solvent can be used for controlling the primer composition to a viscosity suitable to primer coating operation. The kind of the solvent is not particularly restricted so long as it can dissolve the ingredient (A)-ingredient (D) of this invention. Such solvent can specifically include, for example, hydrocarbon solvents such as toluene, xylene, heptane, hexane and petroleum series solvent, halogeno solvents such as trichloroethylene, ester solvents such as ethyl acetate and butyl acetate, ketone solvents such as acetone, methyl ethyl ketone and methyl isobotyl ketone, alcohol solvents such as methanol, ethanol and isopropanol and silicone series solvents such as hexamethylcyclotrisiloxane, octamethylcyclotetrasiloxane, and decamethylcyclopentasiloxane. The solvent may be used alone or in combination of two or more of them.

The blending amount of the solvent is preferably about 100 to 10,000, further preferably, 200 to 2,000 based on 100 parts of the silyl group-containing vinyl polymer as the ingredient (A). If the blending amount of the solvent is less than the range described above, it is not preferred in view of the operability since the viscosity of the primer composition is excessively high. If the blending amount of the solvent is more than the range, no sufficient adhesion can sometimes be obtained.

In the primer composition of this invention, various kinds of aging inhibitors and weather proof adhesion improvers are used optionally. Specific examples of such additives are described in the specification of JP-A-Hei.11-343429.

Further, in the primer composition according to this invention various kinds of fillers are used depending on requirement. Specific examples of the fillers can include, for example, wood powder, pulp, cotton chips, asbestos glass fiber, carbon fiber, mica, nut shell powder, rice hull powder, graphite, diatomaceous earth, white clay, fumed silica, precipitation silica, anhydrous silicic acid, carbon black, calcium carbonate, clay, talc, titanium oxide, magnesium carbonate, quartz, fine aluminum powder, frint powder and zinc powder. Among the fillers, precipitation silica, fumed silica, carbon black, calcium carbonate, titanium oxide and talc are preferred. The fillers may be used alone or in combination of two or more of them. The amount of the fillers when used is preferably 1 to 500 parts and, more preferably, 50 to 200 parts based on 100 parts of the ingredient (A).

Various kinds of additives are added optionally to the primer composition according to this invention in addition to ingredient (A)-ingredient (D), as well as the plasticizer, solvent, aging inhibitor, weather proof adhesion improver and filler as described above.

Examples of such additives can include, for example, a physical property controller for controlling the tensile characteristic of the cured film formed, storage stability improver, radical inhibitor, metal inactivating agent, ozone degradation inhibitor, anti-sagging agent, lubricant, pigment and blowing agent.

Specific examples of such additives are described, for example, in each of the specifications of JP-B-Hei.4-69659, JP-B-Hei.7-108928, Japanese Patent No. 2512468 and JP-A-Sho.64-22904.

For the sealing material applied on the primer layer in this invention, their can be used sealing materials such as of modified silicone, silicone, polyurethane, acryl urethane, polysulfide, modified polysulfide, butyl rubber, acryl, SBR and fluoro containing series materials, oily caulking materials, silicone mastics and sealing materials comprising the saturated hydrocarbon polymer having the reactive silicon group as the main ingredient. Among them, the primer composition of this invention is effective when used to a sealing material comprising the saturated hydrocarbon polymer having the reactive silicon group as the main ingredient and, it is particularly preferred when applied to the sealing material comprising the isobutylene polymer having the reactive silicon group as the main ingredient (for example, isobutylene series sealing material disclosed, for example, in JP-B-Hei04-69659) since the bondability is preferred.

The primer composition according to this invention can firmly bond various kinds of metals such as iron, stainless steel, aluminum, nickel, zinc and copper, synthetic resin materials such as acryl resin, phenol resin, epoxy resin, polycarbonate resin, polybutylene terephtharate resin and alkali treated fluoro resin, glass, ceramic, cement, slate, stone materials such as marble and granite, inorganic materials such as mortar, as well as previously applied sealing material such as modified silicone, silicone, polyurethane, acrylurethane, polysulfide, modified polysulfide, butyl rubber, acryl, SBR, fluoro-containing and isobutylene series materials, with various kinds of sealing materials.

The primer composition according to this invention can be coated on a substrate by using an ordinarily adopted coating method, for example, a brushing method, spray coating method, a wire bar method, blade method, roll coating method or dipping method. The primer composition of this invention can form a film usually at a normal temperature but the film may be formed under various temperature conditions so as to control the film forming rate.

This invention is to be explained concretely with reference to examples and comparative examples but the invention is not limited to them.

PREPARATION EXAMPLE 1

To a reactor having a stirrer, a thermometer, a nitrogen introducing tube, a dropping funnel and a cooling tube, 50 g of toluene was charged and heated to 110° C.

Subsequently, a solution containing 30 g of isobutyl methacrylate, 70 g of γ-methacryloxypropyltrimethoxysilane, 0.6 g of 2,2'-azobis (2-methylbutyronitrile) and 50 g of toluene dissolved therein was continuously added for three hours to the reactor. After the completion of the addition of the monomer, polymerization was conducted further for 2 hours to obtain a solution of a silyl group-containing vinyl polymer (A-1) with a solid concentration of 50% by weight and having a number average molecular weight (Mn) by GPC (converted at polystyrene) of 21,000.

PREPARATION EXAMPLES 2 TO 6

50% by weight toluene solutions of silyl group-containing vinyl polymers (A-2 to A-6) were obtained in the same manner as in Preparation Example 1 except for changing the monomer composition ratio to the value shown in Table 1.

TABLE 1

| Preparation Example | | 1 | 2 | 3 | 4 | 5 | 6 |
|---|---|---|---|---|---|---|---|
| Number for silyl containing vinyl copolymer | | A-1 | A-2 | A-3 | A-4 | A-5 | A-6 |
| Monomer (g) | Isobutyl methacrylate | 30 | | | | | |
| | 2-ethylhexyl methacrylate | | 30 | | | | |
| | Stearyl methacrylate | | | 30 | | | 15 |
| | Methyl methacrylate | | | | 30 | 50 | |
| | Styrene | | | | | | 50 |
| | γ-methacryloxypropyl-trimethoxy silane | 70 | 70 | 70 | 70 | 50 | 35 |
| Initiator (g) | 2,2'-azobis(2-methyl butylonitrile) | 0.5 | 0.5 | 0.5 | 0.5 | 0.5 | 1.4 |
| Number average molecular weight × $10^{-4}$ | | 2.1 | 1.4 | 1.5 | 1.4 | 1.4 | 1.4 |

PREPARATION EXAMPLE 7

To a 2 L pressure proof glass vessel, a three-way cock was attached and the inside of the vessel was replaced with nitrogen and, subsequently, 138 ml of ethyl cyclohexane (dried by being left together with molecular sieve 3A for one night or more), 1012 ml of toluene (dried by being left together with molecular sieve 3A for one night or more) and 8.14 g (35.2 mmol) of p-DCC (the following compound) were added to the vessel by using a injection syringe.

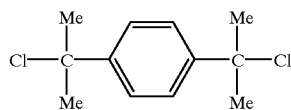

Then, a liquefying sampling tube made of pressure resistant glass with a needle valve containing 254 ml (2.99 mol) of isobutylene monomer was connected to the three-way cock, and a polymerization vessel was cooled by being immersed in a dry ice/ethanol bath at −70° C. and then the pressure inside of the vessel was reduced by using a vacuum pump. After opening the needle valve and introducing the isobutylene monomer from the liquefying gas sampling tube into the polymerization vessel, the pressure in the vessel was returned to a normal pressure by introducing nitrogen from one of the three-way cocks. Then, 0.387 g (4.15 mmol) of 2-methylpyridine was added. Then, 4.90 ml (44.7 mmol) of titanium tetrachloride was added to start polymerization. 70 minuntes after the starting of the polymerization, 9.65 g (13.4 mmol) of allyl trimethylsilane was added to conduct a reaction of introducing an allyl group to the terminal end of the polymer. 120 minutes after the addition of allyl trimethylsilane, the reaction solution was washed by four times each time with 200 ml of water and then the solvent was distilled off to obtain allyl terminated isobutylene polymer.

After elevating the temperature of the thus obtained 120 g of the allyl terminated isobutylene polymer to 90° C., 1.5 g {eq/vinyl group} of methyl dimethoxysilane and 5×10$^{-5}$ {eq/vinyl group} of platinum (vinyl siloxane) complex were added to conduct hydrosilylating reaction. The reaction was traced by FT-IR and olefin absorption at 1640 cm$^{-1}$ disappeared in 5 hours.

Aimed isobutylene polymer: B-1 (the following compound) having the reactive silicon groups on both terminal end was obtained.

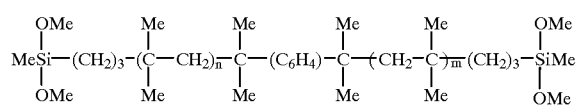

The yield was calculated based on the resultant amount of the thus obtained polymer, and Mn and Mw/Mn were determined by GPC method, and the terminal structure was determined by measuring and comparing the intensity of resonance signals of protons attributable to each of the structures (proton attributable to initiator: 6.5 to 7.5 ppm, methyl proton bonded to silicon atom attributable to polymer terminal end: 0.0–0.1 ppm and methoxy proton: 3.4–3.5) by 300 MHz $^1$H-NMR analysis. H-NMR was measured in CDCl$_3$ using Varian Gemini 300 (300 MHz).

FT-IR was conducted by IR-408 manufactured by Shimazu Seisakusho, GPC was conducted by using Waters LC Module 1 for the liquid feed system and column chromatography was conducted by using Shodex K-804. The molecular weight is given as a relative molecular weight to polystyrene standard. The analysis value for the polymer was: Mn=5800, Mw/Mn=1.35, Fn(silyl)=1.90 (the number average molecular weight was determined being converted as polystyrene, the number of terminal end silyl functional group corresponds to the number per one molecule of isobutylene polymer).

PREPARATION EXAMPLE 8

A three-way cock was attached to a 200 ml four-necked flask and, after replacing the inside of the vessel with nitrogen, 41.8 g (containing 0.50 mol of 1,2-vinyl group) of Nisseki Polybutadiene B-3000 (number average molecular weight: 3000, having 1,2-vinyl contents of 65% on the butadiene unit) manufactured by Nippon Petrochemical Co. was dissolved under nitrogen in 67.8 g of toluene (dried by being left together with molecular sieve 3A over night or more) and 74.6 μl ($2\times10^{-5}$ equivalent/1,2-vinyl group) of platinum (vinyl siloxane) complex (3 wt % xylene solution) was added and the liquid temperature was elevated to 60° C. Then, 27.4 g (0.25 mol) of methyldimethoxysilane was gradually dropped by using a dropping tube while taking care for the heat of reaction. After the completion of dropping, a solution temperature was kept at 80° C. and reaction was conducted for three hours and then elimination of SiH group (at 2150 cm$^{-1}$) was confirmed by IR. The thus obtained solution was transferred to a 200 ml of an egg plant type flask and the solvent was distilled off by an evaporator to obtain an aimed polybutadiene polymer having reactive silicon group: B-2. The Si equivalent was 3.7 mmol/g.

EXAMPLES 1–8 AND COMPARATIVE EXAMPLES 1–3

Primer compositions were prepared by mixing the silyl group-containing vinyl polymer (50 wt % toluene solution: A-1 to A-3) as the ingredient (A) obtained in Preparation Examples 1 to 3, the saturated hydrocarbon polymer having the reactive silicon group (B-1) as the ingredient (B) obtained in Preparation Example 7 or the polybutadiene polymer having the reactive silicon group (B-2) as the ingredient (B) obtained in Preparation Example 8, ethyl silicate 40 (manufactured by Colcoat Co.) as the silicate compound of the ingredient (C) and γ-(2-aminoethyl) aminopropyltriethoxy silane (manufactured by Shinetsu Chemical Industry Co., trade name: KBE-603) or γ-(2-aminoethyl)aminopropylmethyldithoxy silane (manufactured by Shinetsu Chemkcal Industry Co., trade name: KBM-602) as the silane coupling agent for the ingredient (D), tetra-n-butyl titanate (manufactured by Wako Junyaku Industry Co.) and tin octylate (manufactured by Nitto Kasei Co., trade name Neostan U-28) as the silanol condensation catalyst, and hexane and isopropanol as the solvent (manufactured by Wako Junyaku Industry Co.) at the weight ratio shown in Table 2.

In Examples 1 to 8 and Comparative Examples 1 to 3, the tensile bond strength was evaluated by the following test method. Float glass according to JIS A-5758 (manufactured by Koensha Co., designated by Japan Sealing Material Industry Association, sized: 5×5×0.5 cm), anodized aluminum (manufactured by Koensha Co., designated by Japan Sealing Material Industry Association, sized: 5×5×0.5 cm), aluminum plate with baked coating of acrylic paint (manufactured by Koensha Co., sized: 5×5×0.5 cm) and electrolysis colored aluminum plate (manufactured by Koensha Co., sized: 5×5×0.5 cm) were cleaned with methyl ethyl ketone (manufactured by Wako Junyaku Industry Co.), for which primers in Table 1 were coated once by brushing. Isobutylene series sealing material manufactured by Sunstar Giken Co. (trade name: Penguin Seal 7000) was put at 5 mm thickness on the film of the primer layer formed by being left at 23° C. for 30 min. or more. The curing condition was 23° C.×7 days in each case. After curing, a cut of about 1 cm was formed to the bonded area using a cutter knife and then the curing product was peeled from the substrate by hand peeling and then the surface of the substrate was observed. The blending composition of the primers and the result of evaluation of the adhesion test are collectively shown in Table 2. In the table, "++" indicates cohesive failure, "+" indicates partial boundary failure and "−" indicates boundary failure.

The primer compositions shown in Comparative Examples 1 to 3 comprise primers containing only the ingredient (A) or the ingredient (B) which show the adhesion strength to some extent but often cause partial boundary failure and the adhesion strength does not reach a satisfactory level. On the other hand, the primer composition of Examples 1 to 8 in which both of the ingredient (A) and the ingredient (B) are added together show relatively satisfactory adhesion strength and show cohesive failure in almost adherends.

EXAMPLES 9 TO 12 AND COMPARATIVE EXAMPLES 4 TO 5

Primer compositions were prepared by mixing each of the ingredients at the weight ratio shown in Table 3 and the tensile bond strength test by hand peeling was conducted in the same manner as described above.

TABLE 2

| Primer composition (parts by weight) | | Examples | | | | | | | | Comparative Examples | | |
|---|---|---|---|---|---|---|---|---|---|---|---|---|
| | | 1 | 2 | 3 | 4 | 5 | 6 | 7 | 8 | 1 | 2 | 3 |
| (A) | A-1 (*) | 200 | 200 | | | | | | | 200 | | |
| | A-2 (*) | | | 200 | 200 | | | | | | 200 | |
| | A-3 (*) | | | | | 200 | 200 | 200 | 200 | | | |
| (B) | B-1 | 50 | | 50 | | 50 | | 50 | 50 | | | 100 |
| | B-2 | | 50 | | 50 | | 50 | | | | | |
| (C) | Ethyl silicate 40 | 25 | 25 | 25 | 25 | 25 | 25 | | 25 | 25 | 25 | 25 |
| (D) | KBE-603 | 50 | 50 | 50 | 50 | 50 | 50 | 50 | | 50 | 50 | 50 |
| | KEM-602 | | | | | | | | 50 | | | |
| Catalyst | Ti(CBu)$_4$ | 25 | 25 | 25 | 25 | 25 | 25 | 25 | 25 | 25 | 25 | 25 |
| | U-28 | 5 | 5 | 5 | 5 | 5 | 5 | 5 | 5 | 5 | 5 | 5 |
| Solvent | Hexane | 450 | 450 | 450 | 450 | 450 | 450 | 450 | 450 | 450 | 450 | 450 |
| | i-PrOH | 50 | 50 | 50 | 50 | 50 | 50 | 50 | 50 | 50 | 50 | 50 |
| Adhesion | Float glass | ++ | ++ | ++ | ++ | ++ | ++ | ++ | ++ | + | + | ++ |
| | anodized aluminum | ++ | ++ | ++ | ++ | ++ | ++ | ++ | ++ | + | + | ++ |
| | Bake-coated aluminum | ++ | ++ | ++ | ++ | ++ | ++ | ++ | ++ | + | + | − |
| | Electrolysis colored aluminum | + | ++ | ++ | ++ | ++ | ++ | ++ | ++ | − | + | + |

(*): A-1 to A-3 are 50 wt % toluene solution

TABLE 3

| Primer composition | | Example | | | | Comparative Example | |
|---|---|---|---|---|---|---|---|
| (parts by weight) | | 9 | 10 | 11 | 12 | 4 | 5 |
| (A) | A-4 (*) | 200 | 200 | | | 200 | |
|  | A-5 (*) | | | 200 | 200 | | 200 |
| (B) | B-1 | 50 | | 50 | | | |
|  | B-2 | | 50 | | 50 | | |
| (C) | Ethyl silicate 40 | 25 | 25 | 25 | 25 | 25 | 25 |
| (D) | KBE-603 | 50 | 50 | 50 | 50 | 50 | 50 |
| Catalyst | Ti (OBu)$_4$ | 25 | 25 | 25 | 25 | 25 | 25 |
|  | U-28 | 5 | 5 | 5 | 5 | 5 | 5 |
| Solvent | Hexane | 100 | | 100 | | | |
|  | Toluene | 350 | 250 | 350 | 250 | 250 | 250 |
|  | i-PrOH | 50 | 50 | 50 | 50 | 50 | 50 |
| Adhesion | Float glass | ++ | ++ | + | ++ | – | – |
|  | anodized aluminum | ++ | ++ | ++ | ++ | – | – |
|  | bake-coated aluminum | ++ | ++ | ++ | ++ | – | – |
|  | Electrolysis colored aluminum | ++ | + | + | + | – | – |

(*): A-4 and A-5 are 50 wt % toluene solution

In a case where the silyl group-containing vinyl polymer containing the monomer unit of methyl methacrylate (A-4 to A-5) were used as the ingredient (A) with no addition of the ingredient (B), boundary failure was shown to all adherends as shown in Comparative Examples 4 to 5. On the other hand, the primer compositions of Examples 9 to 12 in which the ingredient (B) was added together shows partial boundary failure but showed relatively good adhesion.

EXAMPLES 13–14

The primer compositions were prepared by mixing each of the ingredients at the weight ratio shown in Table 4. As the silane coupling agent for the ingredient (D), γ-(2-aminoethyl)aminopropyltriethoxysilane (manufactured by Shinetsu Chemical Industry Co., trade name: KBE-603) and γ-mercaptopropyltrimethoxysilane (manufactured by Nippon Yunika Co., trade name: A-189) were added together.

TABLE 4

| Primer composition | | Example | |
|---|---|---|---|
| (pats by weight) | | 13 | 14 |
| (A) | A-3 (*) | 200 | |
|  | A-6 (*) | | 200 |
| (B) | B-1 | 50 | 50 |
| (C) | Ethyl silicate 40 | 25 | 25 |
| (D) | KBE-603 | 25 | 25 |
|  | A-189 | 25 | 25 |
| Catalyst | Ti(OBu)$_4$ | 25 | 25 |
| Solvent | Hexane | 450 | 450 |
|  | i-PrOH | 150 | 150 |
| Adhesion | Anodized aluminum | ++ | ++ |
|  | Electrolysis colored aluminum | ++ | ++ |
|  | Mortal | + | ++ |

(*) A-3, A-6: 50 wt % toluene solution

In Examples 9 to 12 and Comparative Examples 4 to 5, the tensile bond strength was evaluated by using the main agent and the curing agent prepared by the method described below.

5 parts of epoxided polybutadiene (manufactured by Asahi Denka Industry Co., trade name: BF-1000), 60 parts of hydrogenated α-olefin oligomer (manufactured by Idemitsu Petrochemical Co., trade name: PAO5004), 50 parts of colloidal calcium carbonate (manufactured by Maruo Calcium Co., trade name: Seeretz 200), 50 parts of colloidal calcium carbonate (manufactured by Maruo Calcium Co., trade name; MC-5), 40 parts of heavy calcium carbonate (manufactured by Shiraishi Calcium Co., trade name: Softon 3200), 3 parts of photo-curable resin (manufactured by Toa Gosei Co., trade name: Aronix M-309), one part of benzotriazole UV-absorber (manufactured by Nippon Ciba-geigy Co., trade name: Tinubin 327), one part of hindered amine light stabilizer (manufactured by Sankyo Co., trade name: Sanol LS-770), one part of hindered phenol antioxidant (manufactured by Nippon Ciba-geigy Co., trade name: Irganox 1010) and 5 parts of $H_2O$ were metered respectively and thoroughly kneaded with 150 parts of a saturated hydrocarbon polymer having reactive silicon groups (manufactured by Kanegafuchi Kagaku Kogyo Co., trade name: Epion EP505S) by using three paints rolls to form a main agent.

Further, 3 parts of tin octylate (manufactured by Nitto Kasei Co., trade name: U-28), 0.4 parts of distearyl amine (manufactured by Kao Corp., trade name: Farmin D86), 6.6 parts of paraffinic process oil (manufactured by Idemitsu Kosan Co., trade name: Diana process PS-32), and 20 parts of heavy calcium carbonate (manufactured by Shiraishi Calcium Co., trade name: Whiten SB) were metered respectively and kneaded manually in a disposal cup and then stirred at a number of rotation of 10,000 rpm for 10 min. by using Excel Autohomogenizer manufactured Nippon Seiki Seisakusho Co. The procedures were repeated three times to prepare a curing agent.

The tensile bond strength was evaluated by the following test method. Anodized aluminum (manufactured by Koensha Co., designated by Japan Sealing Material Industry Association, sized: 5×5×0.5 cm), electrolysis colored aluminum plate (manufactured by Koensha Co., sized: 5×5×0.5 cm) were cleaned with methyl ethyl ketone (manufactured by Wako Junyaku Industry Co.), for which primers in Table 4 were coated once by brushing. Further, in a case of using mortar (manufactured by Engineering Test Service Co., sized 5×5×1.5 cm) as the adherend, powder or the like adhered on the surface was removed by using a brush and then the primer in Table 4 was coated twice. A mixture of the main agent and the curing agent at a weight ratio of 366/30 was put to about 10 mm thickness on the film of the primer layer formed by being left at 23° C. for 30 min. or more. The curing condition was 23° C.×7 days in each case. Manual peeling test was conducted while cutting the bonded area with a cutter knife after curing and then the surface of the substrate was observed. The blending composition of the primers and the result of evaluation for the adhesion test are collectively shown in Table 4.

As shown in Table 4, each of the primers adheres satisfactorily to each of the adherends and, particularly, adhesion to mortar is satisfactory when a silyl group-containing vinyl polymer having copolymerized styrene (A-6) is used as the ingredient (A).

As described above, the primer composition containing (A) a silyl group-containing vinyl polymer and (B) (a) a saturated hydrocarbon polymer having a reactive silicon group and/or (b) a polybutadiene polymer having a reactive silicon group shows satisfactory adhesion to various kinds of substrates, and shows an advantageous effect when applied to the isobutylene series sealing material. Particularly, when the adherend is a porous material such as mortar, adhesion is improved remarkably by using the silyl group-containing vinyl polymer having copolymerized styrene monomer as the ingredient (A).

The primer composition according to this invention can remarkably improve the adhesion to various kinds of substrates. The effect is particularly useful when applied to the isobutylene series sealing material.

While the invention has been described in detail and with reference to specific examples thereof, it will be apparent to one skilled in the art that various changes and modifications can be made therein without departing from the spirit and scope thereof.

This application is based on Japanese Patent application No. 2000-063047 filed on Mar. 8, 2000 and Japanese Patent application No. 2000-274827 filed on Sep. 11, 2000, the entire contents of which are incorporated hereinto by reference.

What is claimed is:

1. A primer composition comprising
   (A) a vinyl polymer having a main chain substantially comprising vinyl copolymer chain and at least one silicon-containing group having a hydroxy group or a hydrolyzable group bonded to a silicon atom and capable of crosslinking by forming a siloxane bond at the terminal end of main chain and/or side chain, and
   (B) at least one ingredient selected from a group consisting of ingredients (a) and (b):
      (a) a saturated hydrocarbon polymer having at least one silicon-containing group having a hydroxy group or a hydrolyzable group bonded to a silicon atom and capable of crosslinking by forming a siloxane bond, and
      (b) a polybutadiene polymer having at least one silicon containing group having a hydroxy group or a hydrolyzable group bonded to a silicon atom and capable of crosslinking by forming a siloxane bond, and
   a solvent,
   wherein the solvent is used in an amount of from 100 to 10000 parts by weight based on 100 parts by weight of the vinyl polymer (A).

2. A primer composition as defined in claim 1, which further comprising a silicate compound as a ingredient (C).

3. A primer composition as defined in claim 1, which further comprising a silane coupling agent as a ingredient (D).

4. A primer composition as defined in claim 1, wherein the vinyl copolymer of the ingredient (A) has a number average molecular weight within a range from 500 to 50,000, and has, per one molecule, one or more hydrolyzable silyl

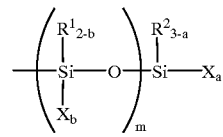

group at the terminal end of the main chain and/or terminal end of the side chain represented by the general formula (1):

wherein $R^1$ and $R^2$ represent each, independently, alkyl group of 1 to 20 carbon atoms, aryl group of 6 to 20 carbon atoms, aralkyl group of 7 to 20 carbon atoms, or a triorganosiloxy group represented by $(R')_3SiO—$ ($R'$ represent each independently substituted or not substituted hydrocarbon group of 1 to 20 carbon atoms), X represent each independently hydroxy group or hydrolyzable group, a is one of [or] 0, 1, 2, or 3, b is one of 0, 1 or 2 in which a and b are not simultaneously 0 and m is 0 or an integer of 1 to 19).

5. A primer composition as defined in claim 1, wherein the vinyl copolymer of the ingredient (A) is a polymer obtained by copolymerization of monomer ingredient comprising styrene monomer as the essential ingredient.

6. A primer composition as defined in claim 1, wherein the saturated hydrocarbon polymer as the ingredient (a) has a number average molecular weight within a range from 500 to 50,000 and has, per one molecule, one or more hydrolyzable silyl group represented by the general formula (1)

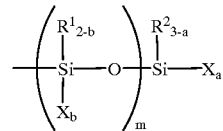

at the terminal end of the main chain and/or terminal end of side the chain.

7. A primer composition as defined in claim 1, wherein the saturated hydrocarbon polymer as the ingredient (a) is a polymer having 50% by weight or more in total of repetition units formed from isobutylene.

8. A primer composition as defined in claim 1, wherein the polybutadiene as the ingredient (b) has a number average molecular weight within a range from 500 to 50,000 and has the hydrolyzable silyl group represented by the general formula (1)

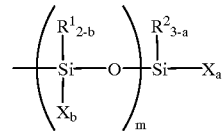

at the terminal end of main side chain and/or terminal end of side chain in an amount from 0.2 to 7.0 mmol/g.

9. A primer composition as defined in claim 3, wherein the silane coupling agent of the ingredient (D) is an amino group-containing silane coupling agent and/or mercaptosilane coupling agent.

10. A method of bonding a sealing material onto a substrate which comprises coating the primer composition as defined in claim 1 onto the substrate and bonding, to the coated surface, a sealing material comprising, as main ingredient, saturated hydrocarbon polymer having at least one silane containing group having a hydroxy group or hydrolyzable group bonded to the silicon atom and capable of crosslinking by forming a siloxane bond.

11. A primer composition as defined in claim 1, wherein the vinyl monomer used to make the vinyl polymer chain of ingredient (A) is selected from the group consisting of (meth)acrylate and styrene.

12. A primer composition as defined in claim 11, wherein the segments other than those comprising vinyl polymer units are about 50 atom % or less of atoms constituting the main polymer chain.

13. A primer composition as defined in claim 11, wherein the segments other than those comprising vinyl polymer units are about 30 atom % or less of atoms constituting the main polymer chain.

14. A primer composition as defined in claim 1 comprising from 1 to 30% by weight of vinyl polymer (A).

15. A primer composition as defined in claim 11 comprising from 1 to 30% by weight of vinyl polymer (A) and from 1 to 30% by weight of saturated hydrocarbon polymer ingredient (B)(a).

16. A primer composition as defined in claim 11 comprising from 1 to 30% by weight of vinyl polymer (A) and from 1 to 30% by weight of polybutadiene polymer ingredient (B)(b).

* * * * *